United States Patent
Ko et al.

(10) Patent No.: US 6,285,418 B1
(45) Date of Patent: Sep. 4, 2001

(54) STORAGE CAPACITOR IN A LIQUID CRYSTAL DISPLAY IN WHICH THE STORAGE CAPACITOR ELECTRODE IS ARRANGED TO OVERLAP AN ENTIRE WIDTH OF THE RECESSED PORTION OF THE GATE LINE

(75) Inventors: Tae-Woon Ko, Seoul; In-Jac Chung, Kumi-shi, both of (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

(21) Appl. No.: 09/466,097

(22) Filed: Dec. 17, 1999

(30) Foreign Application Priority Data

Dec. 21, 1998 (KR) .................................................. 98-56783

(51) Int. Cl.7 .................................................. G02F 1/1343
(52) U.S. Cl. .............................. 349/38; 349/39; 349/145; 349/143
(58) Field of Search ............................... 349/38, 39, 145, 349/139, 143

(56) References Cited

U.S. PATENT DOCUMENTS

| | | | |
|---|---|---|---|
| 5,032,531 | * 7/1991 | Tsutsui et al. | 437/40 |
| 5,132,820 | * 7/1992 | Somera et al. | 359/59 |
| 5,247,289 | * 9/1993 | Matsueda | 345/98 |
| 5,694,185 | * 12/1997 | Oh | 349/46 |
| 5,729,308 | * 3/1998 | Yamazaki et al. | 349/39 |
| 5,734,177 | * 3/1998 | Sakamoto | 257/49 |
| 5,745,194 | * 4/1998 | Nakashima et al. | 349/38 |
| 5,760,857 | * 6/1998 | Yanagawa et al. | 349/43 |
| 5,790,222 | * 8/1998 | Kim | 349/139 |
| 5,822,026 | * 10/1998 | Matsuo | 349/38 |
| 5,852,482 | * 12/1998 | Kim | 349/46 |
| 5,949,507 | * 9/1999 | Shimada et al. | 349/113 |
| 5,955,744 | * 9/1999 | Gu et al. | 257/59 |
| 5,966,190 | * 10/1999 | Dohjo et al. | 349/39 |
| 6,031,589 | * 2/2000 | Kim | 349/39 |

FOREIGN PATENT DOCUMENTS 58 106860    6/1983    (JP) .

* cited by examiner

Primary Examiner—Kenneth Parker

(57) ABSTRACT

A storage capacitor in a liquid crystal display maximizes the area of overlap between a gate line and a subsidiary electrode to compensate for manufacturing deviations, to increase the capacitance of the storage capacitor, and increase the aperture of the liquid crystal display. A liquid crystal display includes a substrate, a gate line on the substrate wherein the gate line includes a straight portion and a recessed portion, a storage capacitor electrode that is overlapped with an entire width of the recessed portion of the gate line, and a pixel electrode that is extended towards the direction of the recessed portion of the gate line.

10 Claims, 2 Drawing Sheets

STORAGE CAPACITOR IN A LIQUID CRYSTAL DISPLAY IN WHICH THE STORAGE CAPACITOR ELECTRODE IS ARRANGED TO OVERLAP AN ENTIRE WIDTH OF THE RECESSED PORTION OF THE GATE LINE

BACKGROUND OF THE INVENTION

1. Field of the Invention

The present invention relates to a liquid crystal display (LCD) having a storage capacitor. More specifically, the present invention relates to improving the image quality of an LCD device by reducing the fluctuations in the capacitance of the storage capacitor.

2. Discussion of the Related Art

A thin film transistor (TFT) LCD includes TFTs functioning as switching devices, capacitors including liquid crystals between an upper plate electrode and a lower plate electrode, subsidiary capacitors, gate lines, and data lines.

For driving a TFT-LCD, a signal voltage is applied to a gate electrode, the TFT then turns on so that a data signal with image data is transmitted to the liquid crystals through the TFT. In the above-described case, the liquid crystals in the capacitor are charged. Ideally, the total electric charge that is stored in the liquid crystals remains constant until the next signal is applied.

However, the liquid crystal voltage varies due to the existence of various sources of capacitance by an amount $\Delta V$, which is expressed by the following approximate formula. $\Delta V = Cgd \ast Vg / (Cgd + CLC + Csto)$, where $\Delta V$ is the maximum amount of variation of the liquid crystal voltage, Cgd is the parasitic capacitance due to the overlap between gate and drain electrodes, CLC is the liquid crystal voltage, Csto is the capacitance of a storage capacitor, and Vg is the voltage of the gate electrode. The existence of $\Delta V$ causes distortion in the liquid crystal voltage and is the primary reason for flickering in the LCD. To decrease $\Delta V$, it is preferable to increase the capacitance of the storage capacitor Csto.

FIG. 1 is a layout view of a LCD having a gate storage capacitor according to the related art. FIG. 2 is a cross-sectional view of the LCD of FIG. 1. Referring to FIG. 1 and FIG. 2, a pixel is defined on a substrate 100 by the intersection of the gate line 11L and data line 15L. A gate electrode 11G is connected to the gate line 11L, a source electrode 15S is connected to the data line 15L, and a drain electrode 15D is arranged so as to oppose the source electrode 15S. An active layer 13 is overlapped with the above-mentioned three electrodes and constitutes a TFT for use as a switching device. A pixel electrode 17 is connected to the drain electrode 15D and covers the pixel area.

A gate storage capacitor is provided by a portion of the gate line 11L, a portion of the pixel electrode 17 which is overlapped with the gate line 11L, another portion of the gate line 11L, and a subsidiary electrode 18 that is overlapped with a portion of the gate line 11L.

For the sake of explanation, in the present specification, a storage capacitor will be defined by the subsidiary electrode 18 and a portion of the gate line which is overlapped by the subsidiary electrode 18.

In the related art, a structure of the storage capacitor includes a gate line 11L for defining a first electrode of a storage capacitor on a substrate 100, and a gate insulating layer 12 disposed on an exposed surface of the substrate 100 including the gate line 11L, a subsidiary electrode 18, which is made of a metal that is used to form the source/drain region, disposed on the gate insulating layer 12. A passivation layer 14 covers the subsidiary electrode 18, and a contact hole is provided in the passivation layer 14 and exposing a portion of the subsidiary electrode 18. A pixel electrode 17 is connected to the subsidiary electrode 18 through the contact hole that is provided in the passivation layer 14.

The capacitance of the storage capacitor is expressed as 'C A/d', where A is the overlapped area between the subsidiary electrode and the gate line, which defines the two electrodes of the storage capacitor, and d is the thickness of the gate insulating layer, which defines the dielectric layer between the electrodes.

However, in the above-described related art structure, the subsidiary electrode is made by patterning a conductive layer for the source/drain region via a photolithography process. In carrying out the photolithography process, the position of the subsidiary electrode 18 may vary due to process errors such as misalignment of the photo mask, or the exposure, or the etchant, or other reasons.

Note that when the overlapped width between the subsidiary electrode 18 and gate line 11L is defined, d1 is set, and the overlapped width becomes equal to or less than d1 since the subsidiary electrode 18 may move due to manufacturing deviations. Because the capacitance fluctuates greatly due to manufacturing deviations, the subsidiary electrode 18 is designed to be small so as to compensate for the manufacturing deviations. Thus, the capacitance of the storage capacitor is reduced because of the reduction in the overlapped area between the subsidiary electrode 18 and the gate line 11L. Accordingly, the conventional LCD has very poor image quality due to flickering and other image defects.

SUMMARY OF THE INVENTION

To overcome the problems described above, preferred embodiments of the present invention provide a LCD having improved gate line patterns of a storage capacitor to reduce fluctuations in the liquid crystal voltage and improve the image quality.

A preferred embodiment of the present invention includes a substrate, a gate line on the substrate, a gate insulating layer covering the gate line, and a storage capacitor electrode on the gate insulating layer, wherein the storage capacitor electrode is arranged to overlap an entire width of the gate line, and wherein the gate line includes a straight line portion and a recessed portion.

In another preferred embodiment of the present invention there is provided a substrate, a gate line on the substrate, the gate line including a gate electrode protruding towards a first direction, a straight region, and a recessed region protruding towards a second direction opposite of the first direction, a data line crossing with the gate line, the data line including a source electrode, a drain electrode arranged such that the drain electrode opposes the source electrode, a storage capacitor electrode overlapped with the recessed region of the gate line, and a pixel electrode connected to the drain electrode.

Therefore, preferred embodiments of the present invention maximize the area of overlap between the gate line and the subsidiary electrode in order to maximize the capacitance of the storage capacitor so that the variance in the capacitance of the storage capacitor due to manufacturing deviations is greatly minimized. Accordingly, the problems related to the related art, namely, flickering and poor image quality, are overcome by preferred embodiments of the present invention.

Other details, features, elements and advantages of the present invention will be described in detail below with reference to preferred embodiments of the present invention and the attached drawings.

BRIEF DESCRIPTION OF THE ATTACHED DRAWINGS

The present invention will become more fully understood from the detailed description given herein below and the accompanying drawings which are given by way of illustration only, and thus do not limit the present invention and wherein.

DETAILED DESCRIPTION OF PREFERRED EMBODIMENTS

Figure 1:
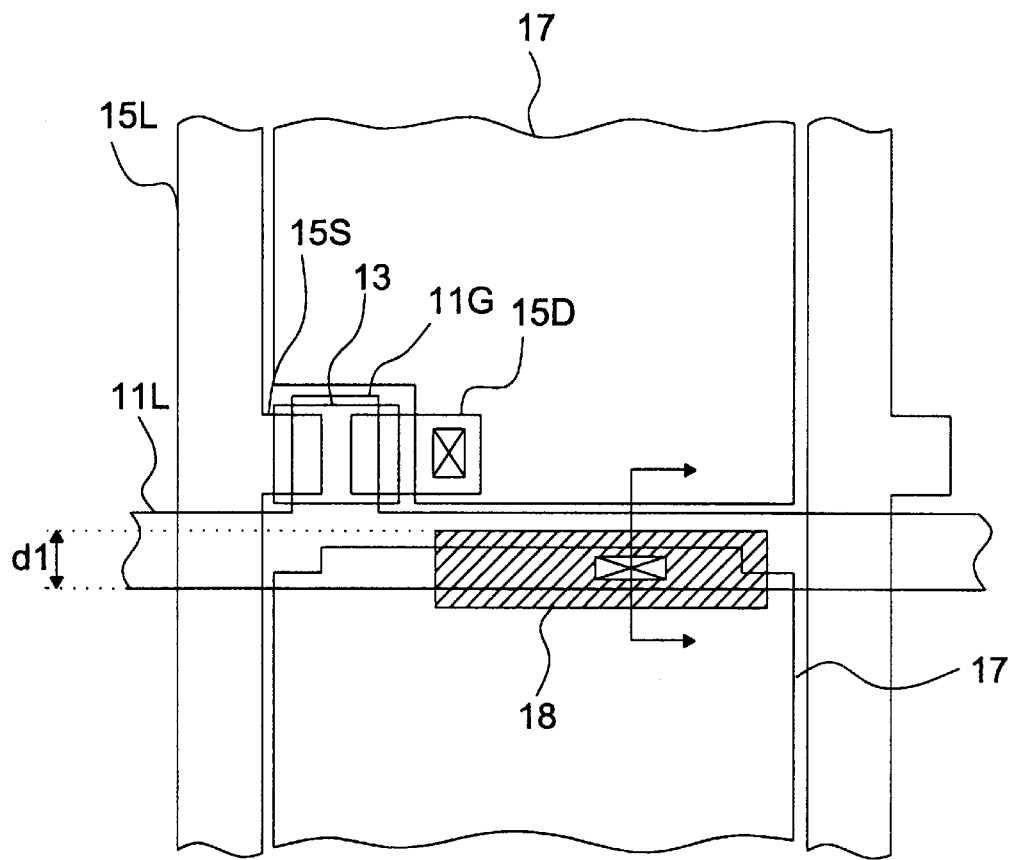
FIG. 1 is a layout view of a LCD according to a related art.
Figure 2:
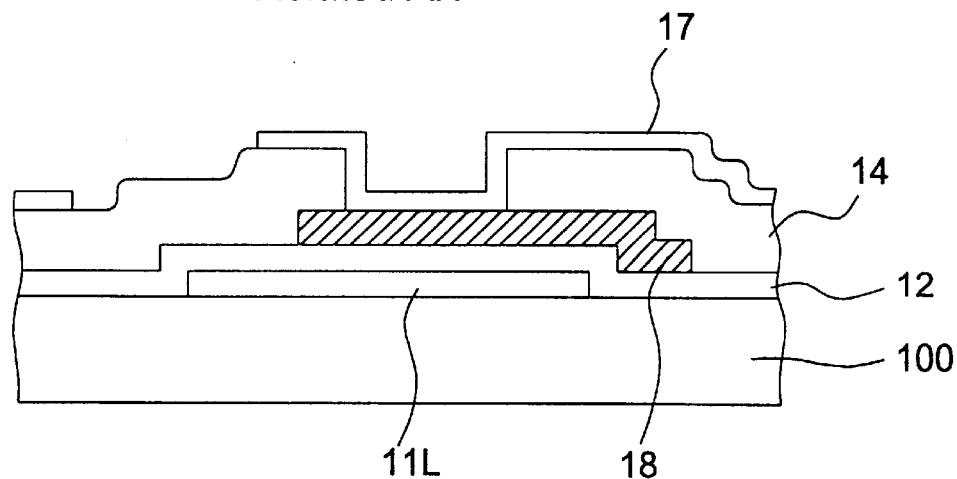
FIG. 2 is a cross-sectional view of a LCD according to a related art.
Figure 3:
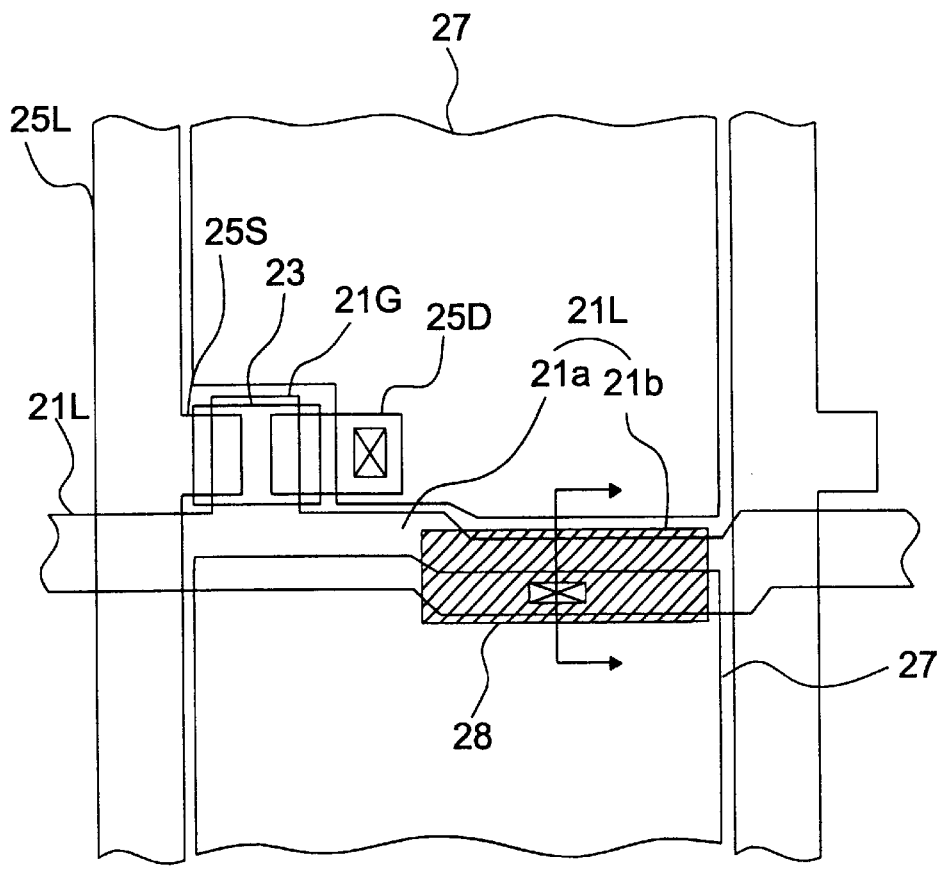
FIG. 3 is a layout view of a LCD according to a preferred embodiment of the present invention.
Figure 4:
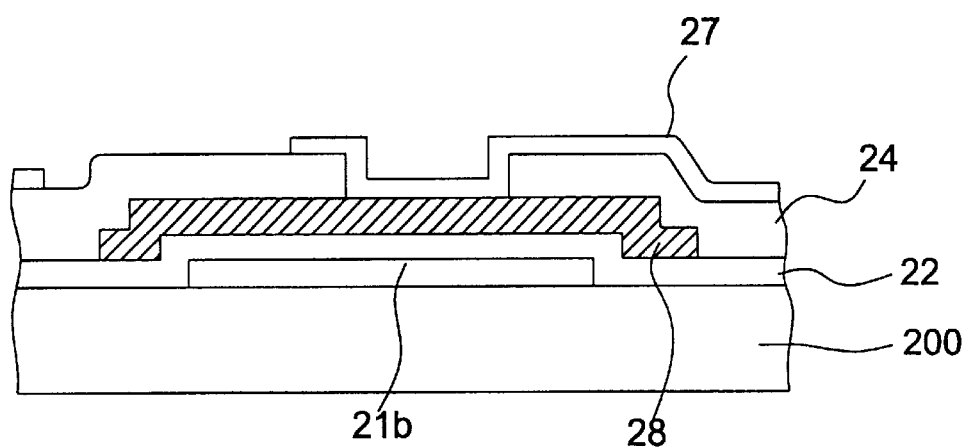
FIG. 4 is a cross-sectional view of a LCD according to a preferred embodiment of the present invention.

FIG. 3 is a layout view of an LCD device according to a preferred embodiment of the present invention. FIG. 4 is a cross-sectional view of the LCD device of FIG. 3. Referring to FIGS. 3 and 4, a pixel is defined on a substrate 200 at the intersection of a gate line 21L and a data line 25L. A source electrode 25S is connected to the data line 25L, and a drain electrode 25D is arranged so as to oppose the source electrode 25S.

The gate line 21L includes a straight region 21a connected to a gate electrode 21G that extends along a straight line in a first direction and a recessed region 21b that deviates from the straight line and extends in a second direction that deviates from the first direction. A pixel electrode 27 is provided in the drain electrode 25D. A storage capacitor is provided in the recessed region 21b of the gate line 21L. The storage capacitor includes the recessed region 21b as a first electrode and a subsidiary electrode 28 as a second electrode. Note that the subsidiary electrode 28 is connected to the pixel electrode 27 and also overlaps with the recessed region 21b. In the gate line 21L, the recessed region 21b is recessed away from the straight region 21a, allowing the subsidiary electrode 28 to extend away from the adjacent pixel electrode 27. Thus, the amount of overlap between the subsidiary electrode 28 with the gate line 21L is increased such that the subsidiary electrode 28 completely covers the recessed region 21b of the gate line 21L.

Therefore, the variance in the capacitance of the storage capacitor due to manufacturing deviations is greatly decreased. Further, the capacitance of the storage capacitor is greatly increased because the subsidiary electrode is extended over the entire width of the gate line to increase the amount of overlap with the gate line.

The structure of the storage capacitor of a preferred embodiment of the present invention is as follows. A recessed region 21b of the gate line 21L defines a first electrode of a storage capacitor, and is disposed on a substrate 200. A gate insulating layer 22 is then disposed on an exposed surface of the substrate 200 including the recessed region 21b of the gate line. A subsidiary electrode 28, which is made of a metal that is used to define a source/drain region, defines a second electrode of the storage capacitor, and is disposed on the gate insulating layer 22. A passivation layer 24 covers the subsidiary electrode 28, and a contact hole exposing a portion of the subsidiary electrode 28 is provided in the passivation layer 24. A pixel electrode 27 connects to the subsidiary electrode 28 through the contact hole, and is disposed on the passivation layer 24.

Note that the amount of overlap between the subsidiary electrode 28, which is extended longer than the adjacent pixel electrode 27, and the gate line 21L is greatly increased. As shown in FIG. 4, the subsidiary electrode 28 covers all of the recessed region 21b of the gate line 21L. In the present preferred embodiment of the present invention, the capacitance of the storage capacitor is thus maximized. Further, as the recessed region 21b of the gate line 21L recedes and deviates from the straight region 21a towards the second direction, the pixel electrode 27 may be extended towards the second direction along with the recessed region 21b of the gate line 21L. Therefore, the aperture ratio of the LCD is also increased since the size of the pixel electrode is increased.

Accordingly, the present invention maximizes the overlapped area between the electrodes of a storage capacitor by improving the gate line patterns to reduce the fluctuations in liquid crystal voltage. The above-described improvements are accomplished by increasing the capacitance of the storage capacitor by extending the subsidiary electrode so that the subsidiary electrode includes a maximized area of overlap with the gate line. Moreover, the aperture ratio is increased as the size of the pixel electrode is also increased by the improved gate line pattern.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A liquid crystal display comprising:
   a substrate;
   a gate line on the substrate, the gate line including a straight line portion and a recessed portion;
   a gate insulating layer covering the gate line;
   a storage capacitor electrode on the gate insulating layer, wherein the storage capacitor is arranged to overlap an entire width of the recessed portion of the gate line; and
   a pixel electrode electrically connected with the storage capacitor electrode.

2. The liquid crystal display according to claim 1, the storage capacitor further comprising:
   a passivation layer covering a whole exposed surface of the substrate including the storage capacitor electrode;
   a contact hole in the passivation layer and exposing a portion of the storage capacitor electrode; and
   a pixel electrode connected to the exposed portion of the storage capacitor electrode.

3. The liquid crystal display according to claim 1, wherein the storage capacitor electrode is made of non-transparent material.

4. The liquid crystal display according to claim 1, wherein the storage capacitor electrode has a width that is greater than a width of the gate line.

5. A liquid crystal display comprising:
   a substrate;
   a gate line on the substrate, the gate line including a gate electrode extending in a first direction that is substantially straight, and a recessed portion that extends in a second direction that is deviated from the first direction;

a data line crossing with the gate line, the data line including a source electrode;

a drain electrode arranged such that the drain electrode opposes the source electrode;

a storage capacitor electrode overlapped with the recessed portion of the gate line; and a pixel electrode connected to the drain electrode.

6. The liquid crystal display according to claim 5, wherein the storage capacitor electrode is arranged to overlap with an entire width of the gate line.

7. The liquid crystal display according to claim 6, wherein a part of the recessed portion extends away from the straight line portion of the gate line towards the second direction.

8. The liquid crystal display according to claim 5, wherein a portion of the pixel electrode is extended towards the second direction along with the recessed portion of the gate line.

9. A liquid crystal display comprising:

a substrate;

a gate line on the substrate extending along a straight line, the gate line including a recessed portion that deviates from the straight line along which the gate line extends and is spaced farther from a pixel electrode than the other portion of the gate line that extends along the straight line;

a gate insulating layer covering the gate line; and a storage capacitor electrode on the gate insulating layer, arranged to overlap an entire width of the recessed portion.

10. The storage capacitor in a liquid crystal display according to claim 9, the storage capacitor further comprising:

a passivation layer covering a whole exposed surface of the substrate including the storage capacitor electrode;

a contact hole in the passivation layer and exposing a portion of the storage capacitor electrode; and a pixel electrode connected to the exposed portion of the storage capacitor electrode.

* * * * *